(12) United States Patent
Nitta et al.

(10) Patent No.: US 7,113,692 B2
(45) Date of Patent: Sep. 26, 2006

(54) DATA PROCESSING DEVICE AND DATA RECORDING METHOD

(75) Inventors: Hajime Nitta, Kanagawa (JP); Toshimichi Hamada, Tokyo (JP); Masashi Ohta, Tokyo (JP); Kiyoshi Ota, Tokyo (JP)

(73) Assignee: Sony Corporation, (JP)

( * ) Notice: Subject to any disclaimer, the term of this patent is extended or adjusted under 35 U.S.C. 154(b) by 1154 days.

(21) Appl. No.: 09/809,941

(22) Filed: Mar. 16, 2001

(65) Prior Publication Data
US 2002/0006270 A1  Jan. 17, 2002

(30) Foreign Application Priority Data
Mar. 17, 2000  (JP)  ............ P2000-081856

(51) Int. Cl.
*H04N 5/95* (2006.01)

(52) U.S. Cl. .................... 386/85; 386/84; 348/512
(58) Field of Classification Search .................. 386/12, 386/13, 48, 71, 84, 85, 91, 95, 96, 98, 116, 386/117; 348/497, 501, 512, 513, 515, 536, 348/554–556; 345/603, 698, 699; 375/240.01, 375/240.12, 240.26, 372; 370/509–517; 360/48, 27, 53
See application file for complete search history.

(56) References Cited

U.S. PATENT DOCUMENTS

| | | | | |
|---|---|---|---|---|
| 4,138,694 A | * | 2/1979 | Doi et al. | 386/91 |
| 5,404,248 A | * | 4/1995 | Shimoda et al. | 360/48 |
| 5,671,260 A | * | 9/1997 | Yamauchi et al. | 375/372 |
| 5,923,377 A | * | 7/1999 | Kenmochi et al. | 348/497 |
| 6,535,688 B1 | * | 3/2003 | Kawamura et al. | 386/95 |
| 6,778,760 B1 | * | 8/2004 | Kagle | 386/96 |

* cited by examiner

*Primary Examiner*—James J. Groody
*Assistant Examiner*—Christopher Onuaku
(74) *Attorney, Agent, or Firm*—Lerner, David, Littenberg, Krumholz & Mentlik, LLP

(57) ABSTRACT

A recording/reproducing device has an NTSC decoder which receives a video signal and outputs a video signal, an MPEG audio encoder which receives an audio signal and outputs an audio signal, and a synchronous control circuit which detects a synchronizing signal from the video signal input to the NTSC decoder and uses that signal to generate an output synchronizing signal that is different from the input synchronizing signal. The output synchronizing signal is used to output the video signal from the NTSC decoder. In the recording/reproducing device, the NTSC decoder and the MPEG audio encoder provide a delay to the input video signal and audio signal, respectively, and output the video signal and audio signal in accordance with the output synchronizing signal generated by the synchronous control circuit.

8 Claims, 5 Drawing Sheets

DATA PROCESSING DEVICE AND DATA RECORDING METHOD

CROSS-REFERENCE TO RELATED APPLICATIONS

The present application claims priority from Japanese Application No. P2000-081856 filed Mar. 17, 2000, the disclosure of which is hereby incorporated by reference herein.

BACKGROUND OF THE INVENTION

This invention relates to a data processing device and a data recording method which are suitable for use in a data recording system for encoding data in accordance with a synchronizing signal.

For digital image compression processing represented by the MPEG (Moving Picture Experts Group) standard or the like, it is assumed that an input standard video signal is encoded in accordance with a predetermined rule. Conventionally, an analog video signal that is actually input is often a nonstandard video signal in the case where a video signal of only one field exists, as in game equipment, or in the case where the temporal length of the frame varies, as in the varying-speed reproduction by a VCR (video cassette recorder), or in the case where the frame is made discontinuous by switching the channel of the input signal. Therefore, when carrying out digital image compression processing by converting an analog video signal to a digital video signal, encoding oftentimes cannot be carried out.

On the other hand, in a conventional technique, if a nonstandard video signal is detected, encoding may be temporarily interrupted and then resumed from a frame of standard video signal without encoding the frame of the nonstandard video signal. That is, conventionally, an asynchronous video signal can be dealt with by temporarily stopping the encoding process. However, this technique of temporarily stopping the encoding process has the drawback that video data to be encoded and output becomes discontinuous.

In another conventional technique, when a field video signal is a nonstandard video signal, processing to reduce or increase the number of lines may be carried out, thus converting the nonstandard video signal to a standard video signal and then encoding the standard video signal. This technique of controlling the number of lines, however, suffers from the drawback that a different image from the original input image is encoded.

In a further conventional technique, an input video signal may be temporarily stored in a frame memory and a master clock which is asynchronous with a synchronizing signal at the time of input may be generated by a crystal oscillator or the like. The input video signal is read out by using the synchronizing signal and the master clock and is then encoded. However, in this technique of reading out a video signal using a synchronizing signal and a master clock and thus encoding the video signal, since the video signal is read out from the frame memory using a master clock which is not synchronized with a synchronizing signal at the time of input, the quantity of delay of the video signal in the frame memory differs between when the video signal is read out using the synchronizing signal and when the video signal is read out using the master clock. In the case where the quantity of delay is not constant as described above, the quantity of delay with respect to an audio signal that is input simultaneously with the video signal is undefined and synchronization between the video signal and the audio signal cannot be achieved.

SUMMARY OF THE INVENTION

Thus, in view of the foregoing status of the art, it is an object of the present invention to provide a data processing device and a data recording method which enable encoding and accurate recording of data even when a nonstandard signal is input.

A data processing device according to one aspect of the present invention includes a video input/output circuit for inputting a video signal and outputting a video signal; a detection circuit for detecting a first synchronizing signal in a video signal input through the video input/output circuit; and a signal generation circuit for generating a second synchronizing signal for a video signal to be output through the video input/output circuit, the signal generating circuit generating the second synchronizing signal using the first synchronizing signal; wherein the input video signal is provided with a delay based on the second synchronizing signal before being output.

A data processing device according to another aspect of the present invention includes a switching circuit for switching between input of a video signal and input of an audio signal; an audio signal encoding circuit for encoding an audio signal input through the switching circuit; a synchronizer for temporarily holding a video signal input through the switching circuit and outputting the video signal; a control circuit for controlling input to the synchronizer and output from the synchronizer on the basis of a synchronizing signal of the video signal; a video signal encoder for encoding the video signal output from the synchronizer; a recording circuit for receiving the audio signal from the audio signal encoding circuit and the video signal from the video signal encoder and recording the audio and video signals on a recording medium; and a controller for controlling operation of the synchronizer and recording of the video signal and the audio signal on the recording medium.

A data recording method according to a further aspect of the present invention includes receiving a video signal and an audio signal; detecting a synchronizing signal in the video signal; holding the video signal by using the detected synchronizing signal; generating a synchronizing signal for an output signal using the detected synchronizing signal; outputting the held video signal based on the generated synchronizing signal; and recording the audio signal and the held video signal on a recording medium as a transport stream.

DESCRIPTION OF THE PREFERRED EMBODIMENTS

A preferred embodiment of the present invention will now be described in detail with reference to the drawings.

Figure 1:
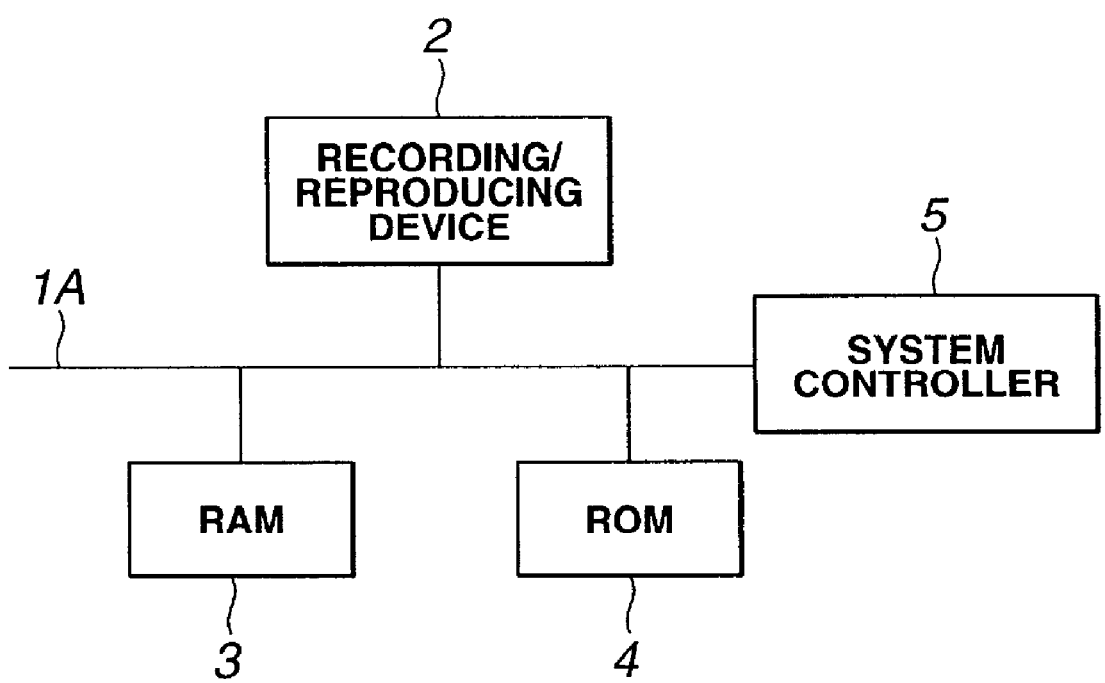
FIG. 1 is a block diagram showing the structure of a recording/reproducing system to which the present invention is applied.

The present invention is applied, for example, to a recording/reproducing system 1 having the structure shown in FIG. 1. The recording/reproducing system 1 includes a recording/reproducing device 2, a RAM (random access memory) 3, a ROM (read only memory) 4, and a system controller 5 which are connected on a host bus 1A. In the recording/reproducing system 1, as control signals are input by the system controller 5, the operation of the recording/reproducing device 2 is controlled. The system controller 5 accesses the RAM 3 and ROM 4 via the host bus 1A, if necessary, thus controlling the whole recording/reproducing system 1.

The recording operation of the recording/reproducing device 2 will be described first.

Figure 2:
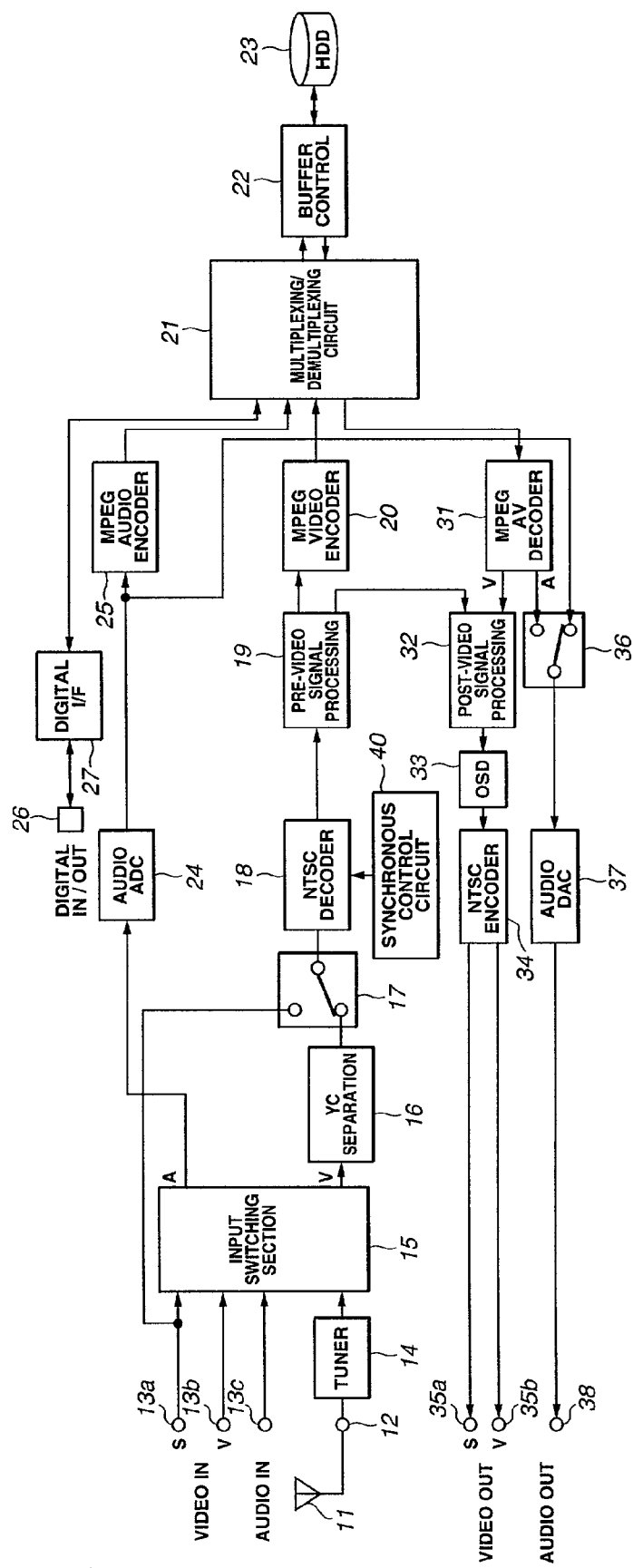
FIG. 2 is a block diagram showing the structure of a recording/reproducing device to which the present invention is applied.

The recording/reproducing device 2 has the structure shown in FIG. 2. The recording/reproducing device 2 is adapted to receive a video signal at a tuner 14 via an antenna terminal 12 connected to an antenna 11 or video signals input from analog input terminals 13a, 13b. The recording/reproducing device 2 records these video signals, as a transport stream, on a recording medium within an HDD (hard disk drive) unit 23 via an input switching section 15, a YC separation circuit 16, a switch section 17, an NTSC (National Television System Committee) decoder 18, a pre-video signal processing circuit 19, an MPEG (Moving Picture Experts Group) video encoder 20, a multiplexing/demultiplexing circuit 21 and a buffer control circuit 22, all under the control of the system controller 5.

The recording/reproducing device 2 is also adapted to receive an audio signal at the tuner 14 via the antenna terminal 12 connected to the antenna 11 or an audio signal input from an analog input terminal 13c, and to record the audio signal as a transport stream on the recording medium within the HDD unit 23 via the input switching section 15, an audio A/D converter 24, an MPEG audio encoder 25, the multiplexing/demultiplexing circuit 21 and the buffer control circuit 22, again under the control of the system controller 5.

The antenna 11 may be, for example, a ground wave receiving antenna. The antenna 11 receives radio waves including a video signal and an audio signal which are superimposed, and outputs the received signal to the tuner 14.

The tuner 14 performs descrambling processing and demodulation processing on the signal received from the antenna 11, thus extracting the video signal and the audio signal, and outputs the video signal and the audio signal to the input switching section 15. An external S video signal input from the analog input terminal 13a, a composite video signal input from the analog input terminal 13b, and an audio signal input from the analog input terminal 13c are all output to the input switching section 15.

The input switching section 15 switches and outputs the video signals and the audio signal input thereto in accordance with a control signal from the system controller 5. The input switching section 15 outputs the video signals to the YC separation circuit 16 and outputs the audio signal to the audio A/D converter 24.

The YC separation circuit 16 performs YC separation processing using the composite video signal, thus generating a video signal made up of a luminance signal (Y) and a color-difference signal (C), and outputs the generated video signal to the switch section 17.

The switch section 17 is supplied with the video signal from the YC separation circuit 16 and the external S video signal input to the analog input terminal 13a. The switch section 17 outputs the external S video signal or the video signal from the YC separation circuit 16 to the NTSC decoder 18 in accordance with a control signal from the system controller 5.

The NTSC decoder 18 performs A/D conversion processing and chroma encode processing on the video signal from the switch section 17, thus converting the video signal to a digital component video signal (hereinafter referred to as video data), and outputs the video data to the pre-video signal processing circuit 19. The NTSC decoder 18 also outputs to a synchronous control circuit 40 a clock generated with reference to a horizontal synchronizing signal of the input video signal, and a horizontal synchronizing signal, a vertical synchronizing signal and a field identification signal obtained by synchronous separation.

The synchronous control circuit 40 generates a timing signal for outputting the signal from the NTSC decoder 18 to the pre-video signal processing circuit 19 on the basis of the horizontal synchronizing signal, the vertical synchronizing signal and the field identification signal from the NTSC decoder 18, and supplies the timing signal to the NTSC decoder 18. The structure of the synchronous control circuit 40 will be described later.

The pre-video signal processing circuit 19 performs various types of video data processing, such as pre-filtering of the video data from the NTSC decoder 18, and outputs the resultant video data to the MPEG video encoder 20 and a post-video signal processing circuit 32.

The MPEG video encoder 20 performs block DCT (discrete cosine transform) processing and MPEG coding processing, such as motion compensation processing, on the video data from the pre-video signal processing circuit 19, thus generating an elementary stream made up of the video data (hereinafter referred to as video ES), and outputs the video ES to the multiplexing/demultiplexing circuit 21. Although compression processing employing the MPEG system is carried out in this embodiment, other compression systems may also be employed or compression processing may be omitted.

Meanwhile, the audio A/D converter 24 supplied with the audio signal from the input switching section 15 performs A/D conversion processing on the input audio signal and outputs audio data to the MPEG audio encoder 25.

The MPEG audio encoder 25 compresses the audio data in accordance with the MPEG system, thus generating an elementary stream made up of the audio data (hereinafter referred to as audio ES), and outputs the audio ES to the multiplexing/demultiplexing circuit 21. Although compression processing employing the MPEG system is carried out in this embodiment, other compression systems may also be employed or compression processing may be omitted.

The multiplexing/demultiplexing circuit 21, at the time of data recording, performs multiplex processing using the video ES from the MPEG video encoder 20, the audio ES from the MPEG audio encoder 25, and various control signals, thus generating a transport stream, and outputs the transport stream to the buffer control circuit 22.

The buffer control circuit 22 carries out control to intermittently transmit the transport stream, which is continuously input from the multiplexing/demultiplexing circuit 21, to the HDD unit 23. When the HDD unit 23 is carrying out a seek operation, the buffer control circuit 22 cannot write the transport stream to the HDD unit 23, and therefore temporarily stores the transport stream in a built-in buffer. When writing becomes possible, the buffer control circuit 22 carries out writing at a higher rate than the input rate from the multiplexing/demultiplexing circuit 21, thus controlling the HDD unit 23 to continuously record the transport stream.

The HDD unit 23 has a recording medium therein, such as a magnetic disk, and records the transport stream at a predetermined address in accordance with a control signal from the system controller 5. As a data input/output protocol between the buffer control circuit 22 and the HDD unit 23, for example, IDE (Integrated Drive Electronics) may be used. Although the use of a magnetic disk is described in connection with this embodiment, the recording medium may be an optical disc, a magneto-optical disc, a solid-state memory or the like.

The reproducing operation of the recording/reproducing device 2 will now be described.

The recording/reproducing device 2 is adapted to decode a transport stream read out from the HDD unit 23 through the buffer control circuit 22, the multiplexing/demultiplexing circuit 21 and an MPEG AV (audio/video) decoder 31, thus preparing video data and audio data. The video data is output via the post-video signal processing circuit 32, an OSD (on-screen display) 33, an NTSC encoder 34 and video signal output terminals 35a, 35b so as to reproduce the video data. The audio data prepared by the MPEG AV decoder 31 is output to the host bus 1A via a switch section 36, an audio D/A converter 37 and an audio signal output terminal 38 so as to reproduce the audio data.

Upon receiving a control signal from the system controller 5 instructing that the data is to be reproduced, the HDD unit 23 seeks a predetermined address, reads out the transport stream from that address, and outputs the read-out transport stream to the buffer control circuit 22.

The buffer control circuit 22 carries out buffer control so as to continuously output the transport stream, which it receives intermittently from the HDD unit 23, to the multiplexing/demultiplexing circuit 21.

The multiplexing/demultiplexing circuit 21 extracts a PES (packetized elementary stream) from the transport stream and outputs the extracted PES to the MPEG AV decoder 31.

The MPEG AV decoder 31 separates the input PES into a video ES and an audio ES and decodes the video ES and the audio ES. The MPEG AV decoder 31 then outputs the decoded video data to the post-video signal processing circuit 32 and outputs the decoded audio data to the switch section 36.

The post-video signal processing circuit 32 is supplied with the video data from the MPEG AV decoder 31 and the pre-video signal processing circuit 19. The post-video signal processing circuit 32 performs output switching, composition, and filter processing on the video data from the pre-video signal processing circuit 19 and the video data from the MPEG AV decoder 31 in accordance with a control signal from the system controller 5, and outputs the video data to the OSD 33.

The OSD 33 generates graphics for video display using the video data from the post-video signal processing circuit 32, and also performs display control processing for composite display and partial display of the video data. The OSD 33 then outputs the video data to the NTSC encoder 34.

The NTSC encoder 34 converts the video data from the OSD 33 to a luminance signal and a color-difference signal and then performs D/A conversion processing, thus obtaining a composite video signal and an S video signal in an analog format. The NTSC encoder 34 outputs the composite video signal to the video signal output terminal 35a and outputs the S video signal to the video signal output terminal 35b.

Meanwhile, the switch section 36 supplied with the audio data from the MPEG AV decoder 31 is also supplied with the audio signal from the MPEG audio encoder 25. The switch section 36 outputs either one of the audio data to the audio D/A converter 37 in accordance with a control signal from the system controller 5.

The audio D/A converter 37 performs D/A conversion processing on the audio data from the switch section 36, thus obtaining an audio signal, and outputs the audio signal to the audio signal output terminal 38.

The recording/reproducing device 2 is also adapted to receive video data and audio data input from a digital input/output terminal 26, and to record the video data and audio data, as a transport stream, on the recording medium within the HDD unit 23 via a digital I/F circuit 27, the multiplexing/demultipiexing circuit 21 and the buffer control circuit 22.

The digital input/output terminal 26 is connected, for example, with an external IRD (integrated receiver decoder) (not shown) and is supplied with video data and audio data from the external IRD via an IEEE (the Institute of Electrical and Electronics Engineers) 1394 digital interface. The digital input/output terminal 26 outputs the video data and audio data from the external IRD to the digital I/F circuit 27 and also outputs the video data and audio data from the digital I/F circuit 27 to the external IRD.

The digital I/F circuit 27 performs processing such as format conversion conformable to the interface connected with the digital input/output terminal 26, thus generating a transport stream, and outputs the generated transport stream to the multiplexing/demultiplexing circuit 21. The recording/reproducing device 2 records the transport stream, input from the digital I/F circuit 27 to the multiplexing/demultiplexing circuit 21, on the recording medium within the HDD unit 23 via the buffer control circuit 22 similarly to the above-described recording.

When reproducing data input via the digital input/output terminal 26, the HDD unit 23 reads out a transport stream from a predetermined address in accordance with a control signal from the system controller 5, and outputs the read-out transport stream to the digital I/F circuit 27 via the buffer control circuit 22 and the multiplexing/demultiplexing circuit 21.

The digital I/F circuit 27 performs processing such as format conversion for outputting to the digital input/output terminal 26 the data input from the multiplexing/demultiplexing circuit 21, and outputs the audio data and video data via the digital input/output terminal 26, thus reproducing the audio data and video data.

Figure 3:
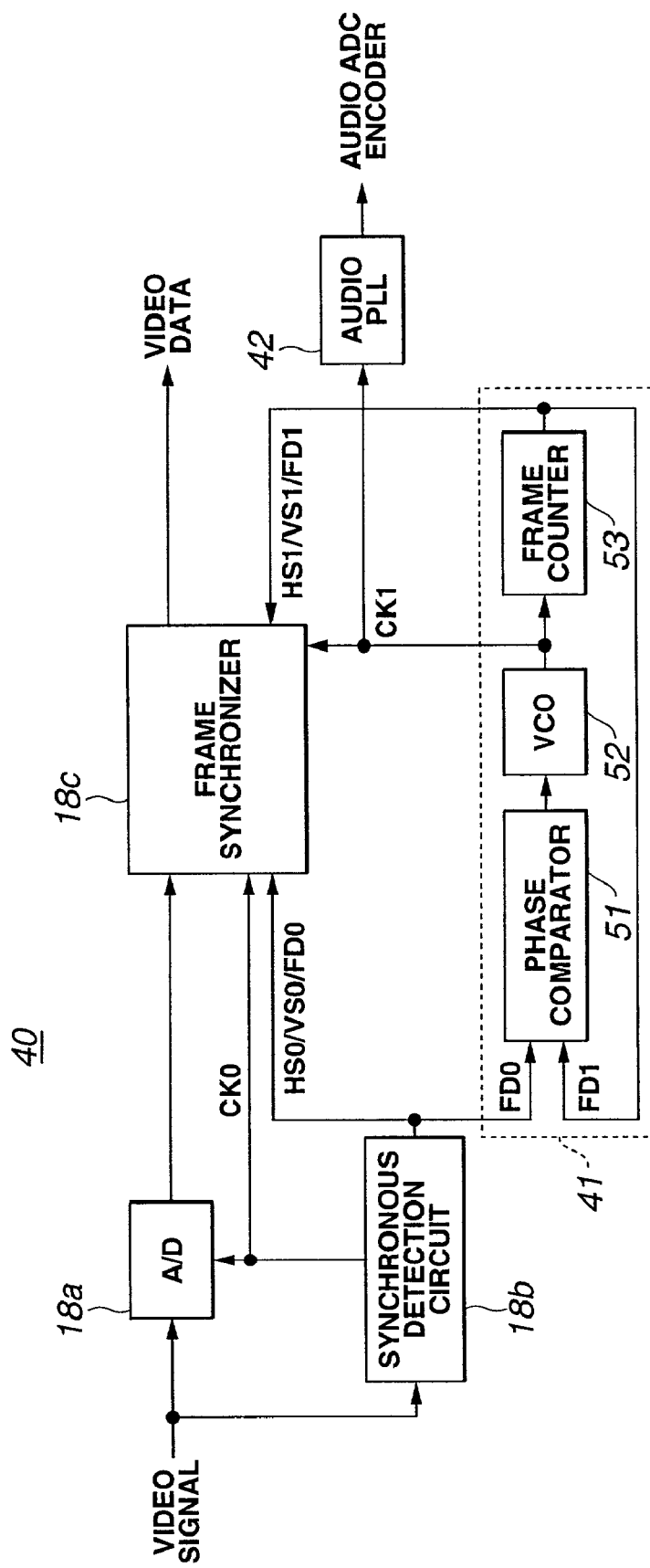
FIG. 3 is a block diagram showing the structure of an NTSC decoder and a synchronous control circuit of the recording/reproducing device to which the present invention is applied.

The structure and operation of the synchronous control circuit 40 will now be described with reference to FIGS. 3 and 4.

The synchronous control circuit 40 is connected via switch section 17 to an A/D conversion processing section 18a, a synchronous detection circuit 18b and a frame synchronizer 18c, all provided inside the NTSC decoder 18. The synchronous control circuit 40 has a PLL (phase-locked loop) circuit 41 connected to the synchronous detection circuit 18b and to the frame synchronizer 18c, and an audio PLL circuit 42 connected to the PLL circuit 41.

The A/D conversion processing section 18a is supplied with a video signal from the switch section 17, then performs A/D conversion processing to provide video data, and outputs the video data to the frame synchronizer 18c.

The synchronous detection circuit 18b is supplied with a video signal from the switch section 17, detects a horizontal synchronizing signal HS0, a vertical synchronizing signal VS0 and a field identification signal FD0 from the video signal, and outputs these signals to the PLL circuit 41 and the frame synchronizer 18c. The synchronous detection circuit 18b also detects from the video signal a sampling clock CK0 for carrying out A/D conversion processing, and outputs the detected sampling clock CK0 to the A/D conversion processing section 18a and the frame synchronizer 18c.

The frame synchronizer 18c includes a memory having a storage capacity of at least one frame and an input/output control circuit. As respective synchronizing signals corresponding to the horizontal and vertical synchronizing signals and the field identification signal of input/output signals and the clock signal are input, the frame synchronizer 18c can control the delay. The frame synchronizer 18c temporarily stores the video data from the A/D conversion processing section 18a. In this case, the frame synchronizer 18c writes the video data which is sampled with the sampling clock CK0 from synchronous detection circuit 18b into the internal memory using the synchronizing signals (horizontal synchronizing signal HS0, vertical synchronizing signal VS0, field identification signal FD0) output from the synchronous detection circuit 18b. The frame synchronizer 18c also outputs the video data to the pre-video signal processing circuit 19 and the MPEG video encoder 20 in subsequent stages in accordance with the synchronizing signal from the PLL circuit 41.

The PLL circuit 41 is formed by connecting a phase comparator 51, a VCO (voltage controlled oscillator) 52 and a frame counter 53 in a loop shape. The phase comparator 51 is connected with the signal output terminals of the synchronous detection circuit 18b and the frame counter 53, and with the signal input terminal of the VCO 52. The VCO 52 is connected with the signal output terminal of the phase comparator 51 and with the signal input terminals of the frame counter 53 and the frame synchronizer 18c. The frame counter 53 is connected with the signal output terminal of the VCO 52 and with the signal input terminals of the frame synchronizer 18c and the phase comparator 51.

The phase comparator 51 is supplied with the field identification signal FD0 from the synchronous detection circuit 18b and a field identification signal FD1 from the frame counter 53. The phase comparator 51 detects an error in phase between the field identification signal FD0 and the field identification signal FD1 and outputs the error signal to the VCO 52.

The VCO 52 generates a sampling clock CK1 on the basis of the error signal from the phase comparator 51, and outputs the generated sampling clock CK1 to the frame counter 53 and the frame synchronizer 18c. Thus, the VCO 52 changes the oscillation frequency.

The frame counter 53 generates a horizontal synchronizing signal HS1, a vertical synchronizing signal VS1 and a field identification signal FD1 using the sampling clock CK1 from the VCO 52, and outputs these signals to the frame synchronizer 18c, and the field identification signal FD1 to the phase comparator 51.

The audio PLL circuit 42 is supplied with the sampling clock CK1 from the VCO 52, which it uses to generate a synchronizing signal for controlling the processing timing of the audio A/D converter 24 and the MPEG audio encoder 25. The audio PLL circuit 42 produces an audio master clock synchronized with the sampling clock CK1 (for example, 27 MHZ), which is the video master clock.

When the field identification signal FD0 detected by the synchronous detection circuit 18b is a signal such as that shown in FIG. 4A, the PLL circuit 41 generates the field identification signal FD1 (FIG. 4C) which is locked in the opposite phase (opposite field) to that of the field identification signal FD0. The vertical synchronizing signal VS0 and the vertical synchronizing signal VS1 are generated at the leading timing and the trailing timing of the field identification signal FD0 and the field identification signal FD1, respectively (as shown in FIGS. 4B and 4D). The audio data is input to the MPEG audio encoder 25 (as shown FIG. 4F) synchronously with the input timing (FIG. 4E) of audio signal to the audio A/D converter 24.

Figure 4:
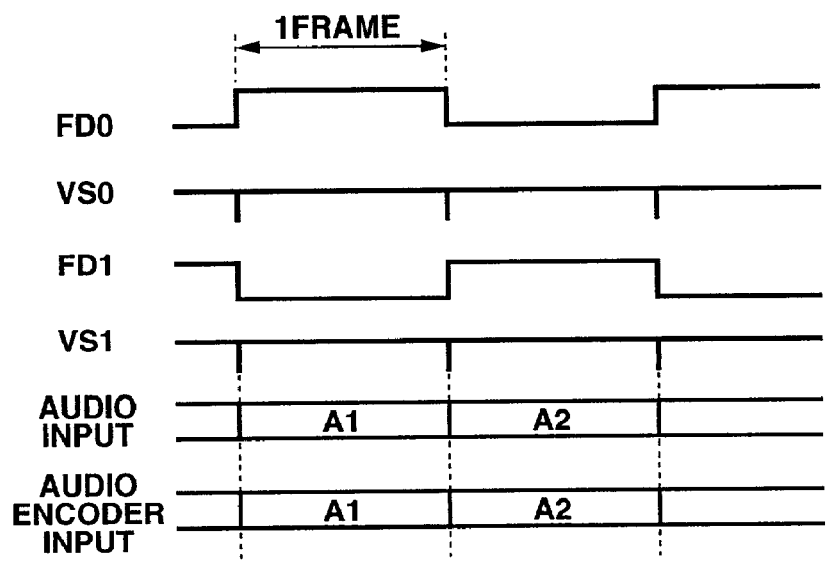
FIG. 4 is a timing chart for explaining the operation of the synchronous control circuit.

In FIG. 4, the frame synchronizer 18c reads out the video data within a frame in accordance with the synchronizing signals (horizontal synchronizing signal HS1, vertical synchronizing signal VS1 and field identification signal FD1), and also reads out video data of a frame in accordance with the sampling clock CK1 generated by the VCO 52, and outputs the read-out video data to the pre-video signal processing circuit 19 and the MPEG video encoder 20. The timing of input from the audio A/D converter 24 to the MPEG audio encoder 25 is synchronized by the audio PLL circuit 42 with the output timing of the video data from the frame synchronizer 18c.

In the recording/reproducing device 2 thus constituted, encoding can be carried out by using video data having the sampling clock CK1 and the synchronizing signals (horizontal synchronizing signal HS1, vertical synchronizing signal VS1, field identification signal FD1) synchronized with the field identification signal FD0 of the input video signal, instead of the video data itself input to the MPEG video encoder 20 from the switch section 17 via the NTSC decoder 18 and the pre-video signal processing circuit 19.

Figure 5:
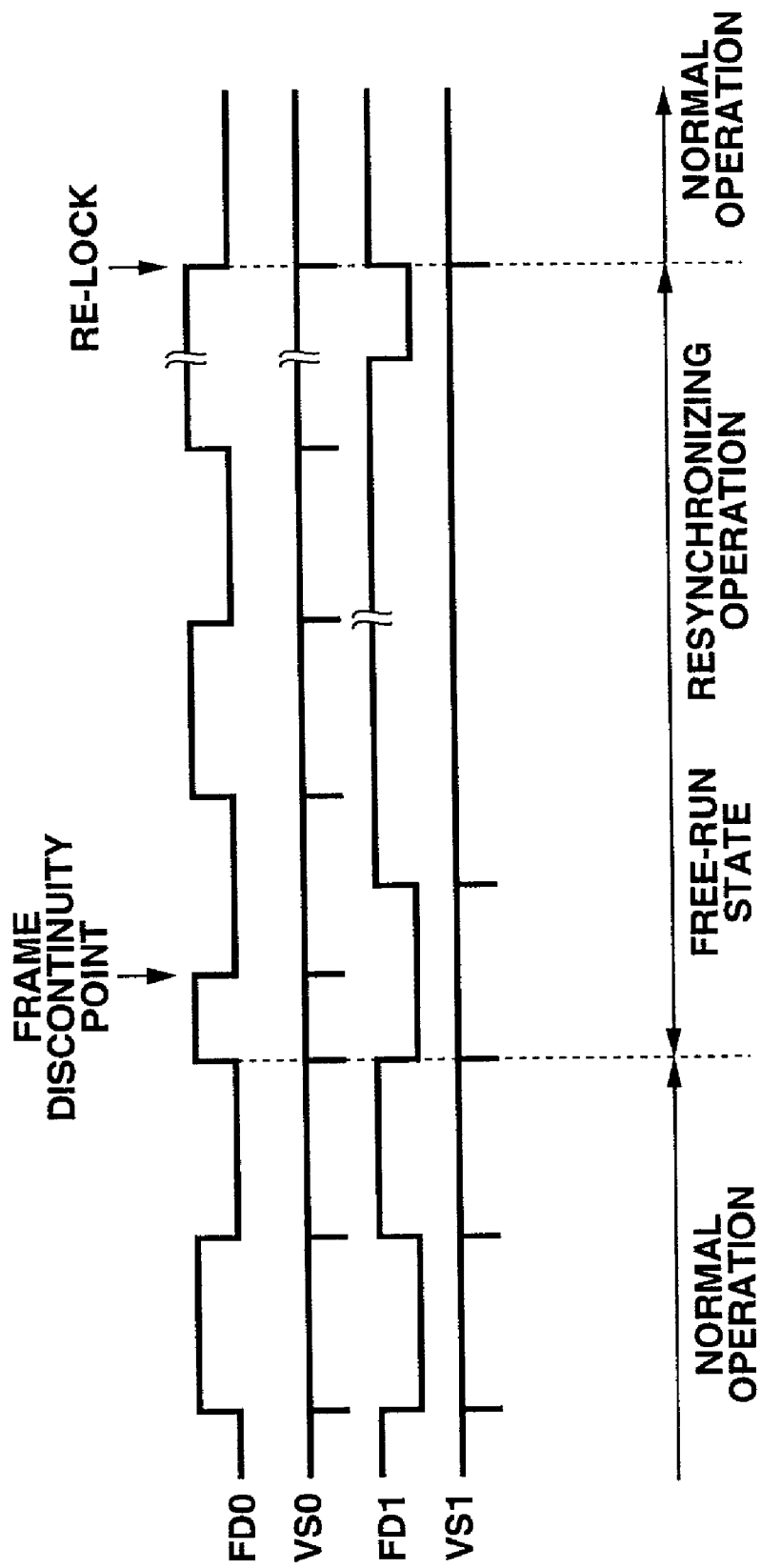
FIG. 5 is a timing chart for explaining the operation of the synchronous control circuit in the case where a nonstandard video signal is input.

The operation of the recording/reproducing device 2 in the case where a discontinuous nonstandard signal is input will now be described with reference to FIG. 5. Before the frame of video data becomes discontinuous, the recording/reproducing device 2 carries out the normal operation in which the encoder input timing of video data and of audio data are synchronized, as shown in FIG. 4. When video data becomes discontinuous, the PLL circuit 41 is set in a free-run state. The video data and audio data are no longer synchronized and the timing of input to the respective encoders is shifted from one another. In this case, the PLL circuit 41 carries out the resynchronizing operation using the field identification signal FD1 so as to restore synchronization and normal operation.

Thus, in the recording/reproducing device 2, even where a video signal of only one field exists, or where the temporal length of a frame varies, as in varying-speed reproduction by a VCR, or where a frame is made discontinuous by switching the channel of the input signal, the influence thereof is moderated by the PLL circuit 41 and the data can be read out and encoded with the accurate horizontal synchronizing signal HS1, vertical synchronizing signal VS1 and field identification signal FD1 generated by the frame counter 53. Therefore, in the recording/reproducing device 2, even where a standard video signal input in accordance with a predetermined rule, as in the MPEG system, is encoded, the influence of a nonstandard video signal on the encoding process can be minimized.

Also, in the recording/reproducing device 2, by inputting the sampling clock CK1 to the audio A/D converter 24 or the MPEG audio encoder 25 within the range where the PLL circuit 41 is locked, the output timing of audio data to the MPEG audio encoder 25 and the output timing of video data to the MPEG video encoder 20 can be synchronized with one another, and the delay of video data can be made constant. As the quantity of delay of video data is made constant, the quantity of delay of video data and audio data can be made constant. Therefore, video data and audio data can be accurately synchronized with one another for encoding.

Since the phase of the writing and reading timing of the frame synchronizer 18c is maintained by the PLL circuit 41, the delay of video data at the frame synchronizer 18c becomes constant and synchronization between video data and audio data is maintained. Moreover, overtaking and repetition of the respective signals is eliminated.

Furthermore, in the recording/reproducing device 2, when a video signal that cannot be followed by the PLL circuit 41 is input, the PLL circuit 41 operates in a free-run state and the phase of writing and reading of the frame synchronizer 18c is not maintained. However, since the frame counter 53 generates accurate synchronizing signals (horizontal synchronizing signal HS1, vertical synchronizing signal VS1, field identification signal FD1) using the clock in the free-run state, encoding will not be interrupted.

As described above in detail, in the data processing device and the data recording method according to the present invention, an input synchronizing signal is detected from an input video signal, and the input video signal and audio signal are temporarily stored. An output synchronizing signal for outputting the video signal is generated by using the input synchronizing signal, and the stored video signal and audio signal are output in accordance with the output synchronizing signal. Therefore, even when a nonstandard signal is input, encoding and accurate recording of data can be carried out.

The invention claimed is:

1. A data processing device, comprising:
   a video input/output circuit for inputting an input video signal and outputting an output video signal;
   a detection circuit for detecting a first synchronizing signal in said input video signal input; and
   a signal generation circuit for using said first synchronizing signal to generate a second synchronizing signal having a delay relative to said first synchronizing signal;
   a storage medium;
   an audio input circuit for inputting an audio signal using said second synchronizing signal; and
   a controller,
   wherein said video input/output circuit is operable to use said second synchronizing signal to output said output video signal and said controller is operable to control recording of said inputted audio signal input through said audio input circuit and said output video signal onto said storage medium such that said inputted audio signal and said output video signal are synchronized by said second synchronizing signal.

2. The data processing device as claimed in claim 1, wherein said video input/output circuit includes a storage circuit for storing said input video signal, and said video input/output circuit being operable to output said stored input video signal in accordance with said second synchronizing signal to provide said output video signal.

3. The data processing device as claimed in claim 1, further comprising
   a phase-locked loop circuit having a clock for carrying out phase locking with said first synchronizing signal, wherein said signal generation circuit being operable to generate said second synchronizing signal based on said clock.

4. The data processing device as claimed in claim 1, wherein said storage medium is selected from the group consisting of a hard disk, a magneto-optical disc, an optical disc, and a semiconductor memory.

5. A data processing device, comprising:
   a switching circuit for switching between input of a video signal and input of an audio signal;
   an audio signal encoding circuit for encoding an audio signal input through said switching circuit;
   a synchronizer for temporarily holding a video signal input through said switching circuit and outputting said video signal;
   a control circuit for controlling input to said synchronizer and output from said synchronizer on the basis of a synchronizing signal of said video signal;
   a video signal encoder for encoding said video signal output from said synchronizer;
   a recording circuit for receiving said audio signal from said audio signal encoding circuit and said video signal from said video signal encoder and recording said audio and video signals on a recording medium; and
   a controller for controlling operation of said synchronizer and recording of said video signal and said audio signal on said recording medium.

6. The data processing device as claimed in claim 5, wherein at least one of said audio signal encoding circuit and said video signal encoder is an MPEG encoder which records a received signal on said recording medium as a transport stream.

7. A data recording method, comprising:
   detecting a synchronizing signal in a video signal;
   holding said video signal by using said detected synchronizing signal;
   generating a second synchronizing signal using said detected synchronizing signal;
   outputting said held video signal using said second synchronizing signal;
   using said second synchronizing signal, synchronizing an audio signal with said outputted video signal; and
   recording said synchronized audio signal and said outputted video signal on a recording medium as a transport stream.

8. The data recording method as claimed in claim 7, wherein said step of generating said second synchronizing signal includes generating said second synchronizing signal based on a clock of a phase-locked loop circuit, said phase-locked loop circuit being phase locked with said detected synchronizing signal.

* * * * *